United States Patent [19]

Uemura

[11] Patent Number: 4,629,875

[45] Date of Patent: Dec. 16, 1986

[54] VERIFYING DEVICE FOR A KEY CARD

[75] Inventor: Saburo Uemura, Yokohama, Japan

[73] Assignee: Macome Corporation, Tokyo, Japan

[21] Appl. No.: 556,307

[22] Filed: Nov. 30, 1983

[30] Foreign Application Priority Data

Dec. 3, 1982 [JP] Japan ................................ 57-212174

[51] Int. Cl.4 ................................................ G06K 7/08

[52] U.S. Cl. ...................................... 235/450; 235/493

[58] Field of Search ......................... 235/450, 449, 493

[56] References Cited

U.S. PATENT DOCUMENTS 3,896,292 7/1975 May et al. ........................... 235/450

*Primary Examiner*—David L. Trafton

*Attorney, Agent, or Firm*—Thomas R. Morrison

[57] ABSTRACT

A verifying device for a key card on which a magnetic signal is recorded is formed of a set card on which a predetermined reference magnetic signal is recorded, a magnetic sensor consisting of a saturable core and a winding wound thereon, an oscillator for supplying a voltage to said winding, a switching element connected to the winding, a power source connected between both ends of the switching element, and an output terminal led out from one of both ends of said switching element. In this case, the saturation magnetic field of the saturable core is so selected that it is larger than the magnetic field itself generated from the reference magnetic signal recorded on the set card in absolute value but smaller than the sum magnetic field of those from the set and key cards in absolute value when the key card is a correct card, so that when the correct key card is inserted into the device to be verified with the set card, the sum magnetic field becomes larger than the saturation magnetic field of the saturable core in absolute value, hence the saturable core is saturated, no output appears at the winding, thus said switching element is turned off and an output indicating that the key card is coincident with the set card is produced at the output terminal.

2 Claims, 6 Drawing Figures

VERIFYING DEVICE FOR A KEY CARD

BACKGROUND OF THE INVENTION

1. Field of the Invention

The present invention relates generally to a magnetic card verifying device which is used as an electronic lock for entrance administration, membership system and the like. More particularly this invention relates to improvements thereof.

2. Description of the Prior Art

Various methods have been proposed for a magnetic card verifying device and the present inventor has previously proposed an influential method or system (disclosed in documents laid open to public inspection Nos. 40781/75 and 38738/76 of Japanese Utility Model Application examined). The above previously proposed system is summarized as follows. In the first, a magnetic card on which a reference magnetic signal (hereinafter referred to as a key code) having a large number of combinations was recorded is inserted into a verifying device in advance as a set card. And, when another magnetic card on which a magnetic signal or key code to be verified was recorded is inserted into the verifying device as a key card, the key codes respectively recorded on the set card and key card are compared and verified in the verifying device. Then, when both of the key codes are coincident with each other, the verifying device generates an output indicative thereof.

FIG. 1 is a schematic diagram showing an example of a magnetic sensor used in such verifying device. In FIG. 1, reference numeral 1 designates an I-shaped magnetic (saturable) core, 2 a primary winding which is wound around the magnetic core 1, 3 a secondary winding which is wound around the magnetic core 1 in the same way as in the primary winding 2, 4 a high frequency (approximately 500 kHz) oscillator connected to the primary winding 2 and 5 and 6 magnetic signal (key code) recorded sections (magnet or magnetized sections) of a set card and a key card, respectively. Reference letter V designates a voltage which is induced across the secondary winding 3. The saturable core 1 and the primary and secondary windings 2 and 3 constitute a saturable transformer S.

FIG. 2 is a graph showing an input to output characteristic of such saturable transformer type magnetic sensor as mentioned above. When a magnetic field H is applied to the saturable core 1 with the windings 2 and 3 by proper means instead of the key code recorded sections 5 and 6 and increased in its absolute value larger than the saturation magnetic field Hs of the core 1, the saturable magnetic core 1 is saturated as shown in FIG. 2. As a result, the output voltage V induced in the secondary winding 3 is rapidly decreased at the saturation points as shown in FIG. 2. Accordingly, in the case where the key code recorded section 6 is not loaded to the magnetic sensor, if the magnetic field A generated by the set card with the key code recorded section 5 is selected larger than the saturation magnetic field +Hs as shown in FIG. 2, the output voltage V from the magnetic sensor becomes small or substantially zero and the magnetic sensor is therefore turned off. Under this state, when the key card is inserted into the magnetic sensor or verifying device, the magnetic field or the key code recorded section 6 of the key card is applied to the saturable core 1. In this case, if the magnetic field generated by the key code recorded section 6 of the key card is oriented in the direction indicated by letter B which is opposite to the direction of the magnetic field A and is substantially the same in magnitude as shown in FIG. 2, the magnetic field B cancels the magnetic field A or the magnetic field applied to the core 1 becomes substantially zero whereby a predetermined output voltage $V_0$ is induced in the secondary winding 3, thus the magnetic sensor being turned on to produce an output indicating that both the cards are coincident. While, if the magnetic field by the key code recorded section 6 is in the direction as indicated at B′ in FIG. 2 or both the cards are not coincident, the magnetic fields A and B′ are added together to be much larger than +Hs so that the magnetic sensor remains in its off-state and hence no output is delivered therefrom. Moreover, when the key card has no key code recorded section 6 (no magnet or is not magnetized), or both the cards are not coincident, namely, when the magnetic field by the section 6 is at point $B^0$ in the graph of FIG. 2, only the magnetic field A is applied to the saturable core 1 so that the magnetic sensor is held also in the off-state and hence no output is delivered therefrom. Accordingly, when the output voltage V from the saturable transformer S indicates the result that the key codes recorded sections 5 and 6 or the set card and key card are compared and verified with each other. When a plurality of (for example, 6 to 8) magnetic signals or key codes are verified, a plurality of key code recorded sections and a plurality of saturable transformers corresponding to the former are utilized as the verifying elements.

FIG. 3 is a schematic diagram showing a constructional example in which a plurality of key codes are verified simultaneously according to the prior art system. In FIG. 3, like parts corresponding to those of FIG. 1 are marked with the same references where reference numeral 5′ designates a set card and 6′ a key card. In this case, reference numeral 5 designates not the magnet but a magnetic signal or key code recorded point which is magnetized on the set card 5′ and reference numeral 6 designates a magnetic signal or key code recorded point which is magnetized on the key card 6′. Each of the saturable transformers S is the same as that in FIG. 1 and is shown more clearly from the electric point of view. The set card 5′ with a plurality of key code recorded points 5 and the key card 6′ with a plurality of key code recorded points 6 are located to grip therebetween a plurality of saturable transformers S such that the magnetic fields generated from the opposing key code recorded points 5 and 6 pass through the corresponding saturable transformer S. Reference numeral 7 designates an amplifier and 8 a verified output terminal. When each of the saturable transformers S is connected in chain or cascade as shown in FIG. 3, if any one of the saturable transformers S is turned off, the output is decreased as a whole and hence the whole of the saturable transformers S is made off. In other words, unless all of the saturable transformers S are turned on, the whole of the saturable transformers S is not turned on so that no output appears at the verified output terminal 8. Thus, the whole of a plurality of key code recorded points can be verified at the same time.

This prior art system described above has an advantage that the key codes recorded on the magnetic card as many dots can be compared and verified with one other by a simple circuit construction and a few of electronic parts thereof and a stable DC output is generated only when the key code signals recorded on the key card 6′ are coincident with those on the set card 5′.

However, this prior art system is not free from the possiblity that when a large current is flowed near the verifying device by construction work or intentionally, or in the case of lightning, without inserting the key card into the vefifying device, the saturable transformer S thereof is instantly made on by electromagnet or electrostatic induction voltage caused thereby and hence an output is generated therefrom. The first reason therefor is: since the output voltage from the saturable transformers S connected in cascade as shown in FIG. 3 is small as approximately from 0.2 to 0.3 Vpp and this output voltage is amplified and rectified to provide the verifiedcoincident output, the verifying device is apt to be disturbed; and the second reason is that since the saturable transformer S in each magnetic sensor of the verifying device is arranged in such a manner that it is turned off normally or in verified-incoincident state, while it is turned on when the verified result is coincident. As a result, when the saturable transformer S is turned off, the disturbing voltage is applied to the small output voltage generated from the saturable transformer S, the output voltage becomes large and the saturable transformer S is turned on. In practice, it is quite rare that the verifying device is disturbed to malfunction. However, in the verifying device utilized for the door-locking system, even such a small possibility of disturbance or the like is not negligible. Therefore, it is necessary to prevent the verifying device from being disturbed to malfunction.

OBJECTS AND SUMMARY OF THE INVENTION

Accordingly it is an object of the present invention to provide an improved magnetic card verifying device.

It is another object of the present invention to provide a magnetic card verifying device free from the defect inherent in the prior art.

It is still another object of the present invention to provide a magnetic card verifying device which is strong against a disturbing voltage.

It is a further object of the present invention to provide a magnetic card verifying device which is safe against a magnetic card made of magnetic material having a strong magnetization.

It is a still further object of the present invention to provide a magnetic card verifying device which is particularly suitable for use with an electronic lock.

According to one aspect of the present invention, there is provided a magnetic verifying device for a key card on which a magnetic signal is recorded comprising:

(a) a set card on which a predetermined reference magnetic signal is recorded;
(b) a first magnetic sensor consisting of a first saturable core and a winding wound thereon;
(c) an oscillator for supplying a voltage to said winding;
(d) a switching element connected to said winding;
(e) a power source connected between both ends of said switching element; and
(f) a first output terminal led out from one of both ends of said switching element, in which a saturation magnetic field of said first saturable core is so selected that it is larger than a magnetic field itself generated from the reference magnetic signal recorded on said set card in absolute value but smaller than a sum magnetic field of that from said set card and that from said key card in absolute value when said key card is a correct card, so that when the correct key card is inserted into the device to be verified with said set card, the sum magnetic field of the magnetic fields from said set card and said key card becomes larger than the saturation magnetic field of said first saturable core in absolute value, hence said saturable core is saturated, no output appears at said winding, thus said switching element is turned off and an output indicating that said key card is coincident with said set card is produced at the output terminal.

The other objects, features and advantages of the present invention will become apparent from the following description taken in conjunction with accompanying drawings through which the like references designate the same elements and parts.

DESCRIPTION OF THE PREFERRED EMBODIMENT

The present invention will be hereinafter described with reference to the attached drawings.

A first embodiment of the magnetic card verifying device according to the present invention which is prevented from being misoperated by the electromagnet or electrostatic induction voltage will be first described. This first embodiment of the magnetic card verifying device according to the present invention employs the saturable core for the magnetic sensor of the verifying device in the same way as in the prior art system. The characteristic of the above embodiment of the magnetic card verifying device, however, lies in the construction of its magnetic sensor which is operated as below. Contrary to that of the prior art, the magnetic sensor used in this embodiment of the invention is turned on when the verification is not made or the key card 6′ is not coincident with the set card 5′ (including the case where both the magnetic signals recorded on the set and key cards are not coincident), while the magnetic sensor is turned off when the verification is made or the key card 6′ is coincident with the set card 5′. In this embodiment of the magnetic card verifying device according to the present invention, as will be mentioned later, the saturable transformer does not need the secondary winding but requires only the primary winding so that the magnetic sensor uses the saturable core.

Figure 4:
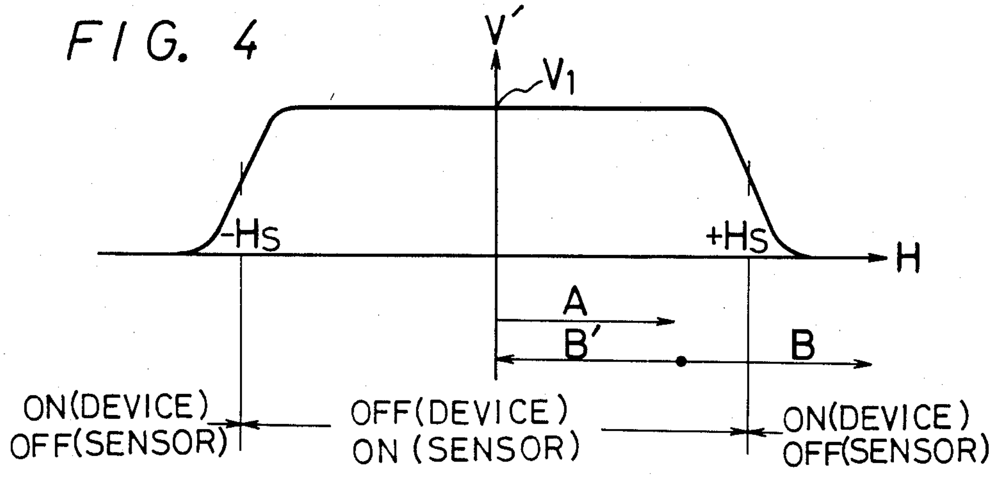
FIG. 4 is a graph showing an input to output characteristic of a saturable core used to explain the principle of an example of the invention.

FIG. 4 is a graph of the input to output characteristic of the saturable core or magnetic sensor used in the first embodiment of the magnetic card verifying device according to the present invention to show its principle.

Figure 1:
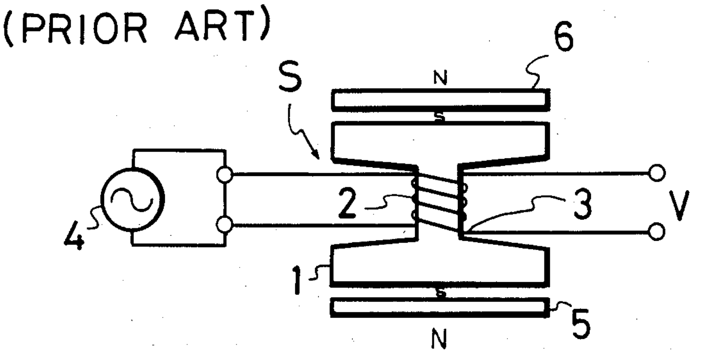
FIG. 1 (PRIOR ART)
FIG. 1 is a schematic diagram showing an example of a magnetic sensor used in a previously proposed magnetic card verifying device.
Figure 2:
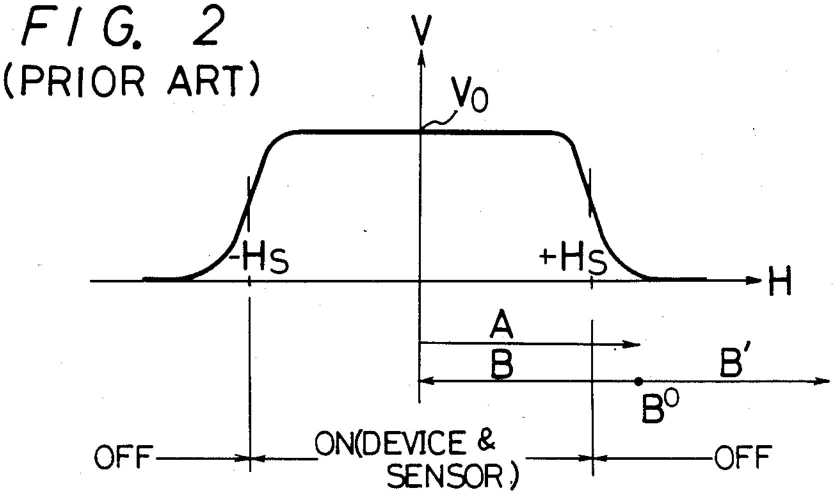
FIG. 2 (PRIOR ART)
FIG. 2 is a graph showing an input to output characteristic of a saturable transformer used in the magnetic sensor shown in FIG. 1.

In the graph of FIG. 4, like references designate the same as those of FIG. 2 in meaning. Reference letter V′ designates a terminal voltage across the primary winding (see FIG. 5). First, in the absolute value, the saturation magnetic field Hs of the magnetic core is selected larger than the magnitudes of the magnetic field generated from the magnetic signals or key codes recorded on any cards including the set card 5′. In the graph of FIG. 4, since the magnetic field generated from the magnetic signal or key code recorded on the set card 5′ is as shown by a letter A, the saturable core is not yet saturated and a large terminal voltage $V_1$ is generated from the winding. When the magnetic field from the key code recorded on the key card 6′ is as shown by a letter B, this key card magnetic field B is added to the set card magnetic field A so that the total magnetic field exceeds the saturation magnetic field +Hs of the core. Thus, the saturable core is saturated and hence the terminal voltage V′ is dropped and accordingly, the magnetic sensor is turned off. Under this state, a verified output indicative of coincidence between the magnetic signals of the set and key cards 5′ and 6′ is produced. When the magnetic field generated from the key card magnetic signal is as shown by B′ in FIG. 4, the magnetic fields A and B′ are cancelled with each other. Thus, the saturable core is not saturated and hence the terminal voltage V′ is not dropped but remains large so that the magnetic sensor holds its on-state. Under this state, the verifying device does not generate any output, verifying that the set card 5′ and the key card 6′ are not coincident with each other.

When, on the contrary, as shown in FIG. 2, the set card magnetic field A is larger than the saturation magnetic field +Hs of the saturable core, it is possible to verify the coincidence among the ternary signal of the key card magnetic fields shown by B, B′ and $B^0$ (of no signal). However, when as shown in FIG. 4 the magnetic field A by the set card 5′ is smaller than the saturation magnetic field +Hs, the magnetic field $B^0$ of no magnetic signal is meaningless so that the verification is made of the binary signal.

Therefore, when both of the set and key cards are verified to be coincident, the terminal voltage V′ of the winding becomes small, while when no verification is made or both the set and key cards are not coincident, the terminal voltage V′ becomes large. Thus, even when a disturbing voltage is applied to the verifying device, the disturbing voltage drives the verifying device in its non-coincidence direction and hence no misoperation is caused.

Figure 3:
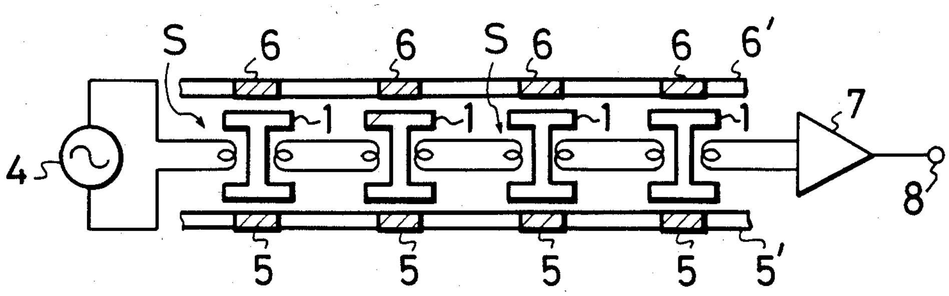
FIG. 3 (PRIOR ART)
FIG. 3 is a schematic diagram showing another example of the previously proposed magnetic card verifying device by which the coincidence among a plurality of magnetic signals or key codes is verified.
Figure 5:
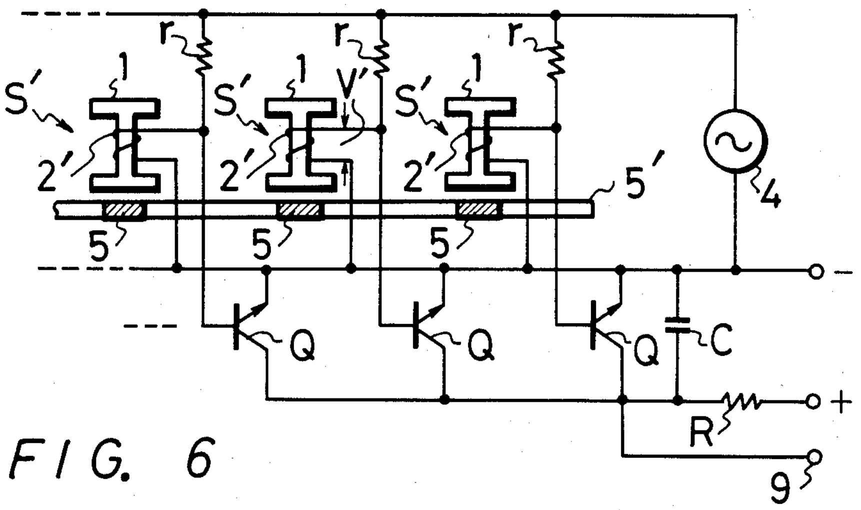
FIG. 5 is a connection diagram showing an embodiment of the magnetic card verifying device according to the present invention.

FIG. 5 is a connection diagram showing the above first embodiment of the verifying device according to the invention on the basis of the above-mentioned principle, in which a plurality of magnetic signals or key code points 5 and 6 are verified. In FIG. 5, like parts corresponding to those of FIG. 3 are marked with the same and similar references and will not be described in detail for simplicity. In this case, only a primary winding 2′ is wound around each saturable core 1, and the saturable core 1 and the primary winding 2′ constitute a saturable magnetic sensor S′. The high frequency oscillator 4 has the frequency of, for example, 500 kHz and the output voltage of 10 Vpp. The high frequency oscillator 4 applies a voltage to each of a plurality of the windings 2′ through each of resistors r of, for example, 1 kΩ. Each of the winding 2′ is connected at its both ends with the base and the emitter of each transistor Q serving as the switching element. The collectors of the respective transistors Q are connected together and then connected through a resistor R of, for example, 10 kΩ to the positive or + terminal of a power source. On the other hand, the emitters of the transistors Q are also coupled together and then connected to the negative or—terminal of the power source. Between both the terminals of the power source is connected a capacitor of, for example, 0.1 μF and a verified output terminal 9 is led out from the common connection point of the collectors of the transistors Q.

With the above verifying device shown in FIG. 5, when the key card 6′ (see FIG. 3 for location) is verified as coincident with the set card 5′ or all the key codes 6 (not shown) of the key card 6′ are verified as coincident with all the set codes 5 of the set card 5′ by all the magnetic sensors S′, respectively, and hence the magnetic sensors S′ are all turned off, all of the transistors Q are turned off so that the verified output at the output terminal 9 becomes the high voltage, indicating that the magnetic signals on both the set and key cards 5′ and 6′ are coindident with one other. Even if any one of the magnetic sensors S′ is not coincident, the terminal voltage V′ at the winding 2′ of the corresponding sensor S′ becomes high, so that the corresponding transistor Q is turned on. Thus, the verified output becomes the low voltage, indicating that the magnetic signals on both the cards 5′ and 6′ are not coincident with one another.

The saturable core 1 is formed of an I-shape thin plate made of permalloy. In this case, in order to increase the saturation magnetic field Hs, it is sufficient to increase the number of such permalloy thin plates. Thus, the saturation magnetic field Hs can be increased with ease in accordance with the magnitude of the magnetic signal recorded on the set and/or key card.

According to this first verifying device, even when the verifying device is applied with the induction voltage and so on upon non-verification, the magnetic sensor S′ holds its on-state. Thus, in principle, this verifying device has an advantage that it is strong against the disturbing voltage.

However, if a key card having the magnetic signal or key code recorded thereon which will generate a magnetic field considerably larger than the saturation magnetic field Hs is loaded to the verifying device, it is possible that, regardless of the direction of the magnetic field generated from the key card, the magnetic sensor S′ is saturated and free from the key code, the verified output indicative of the coincidence between the set and key cards is generated.

Now, a second embodiment of the magnetic card verifying device according to the present invention which is free from the problem of the first embodiment will be described.

Figure 6:
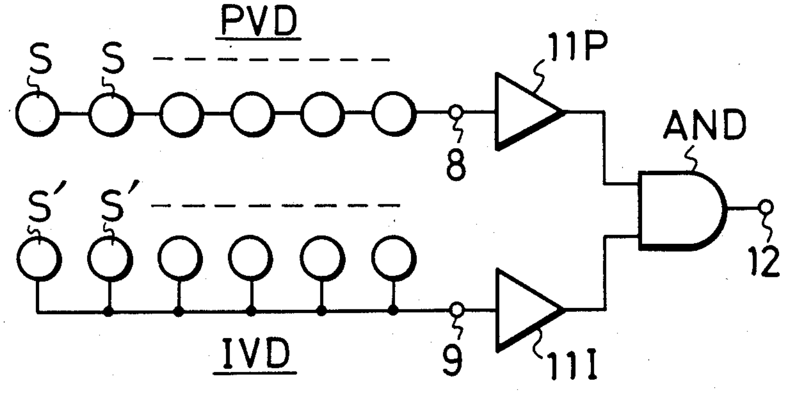
FIG. 6 is a schematic diagram showing another embodiment of the magnetic card verifying device according to the present invention.

FIG. 6. is a schematic diagram showing the second embodiment of the present invention, and the illustrative example shows a case where the verifying device is applied to verify a key card which includes 12 magnetic signal or key code points to be verified, by way of example. In this example, of the 12 magnetic signal points, 6 points are verified by the prior art verifying device PVD connected in cascade as shown in FIG. 3 while the remaining 6 points are verified by the first verifying device IVD connected in parallel as shown in FIG. 5. The coincidence verified outputs from both the verifying devices PVD and IVD are supplied through amplifiers 11P and 11I to two input terminals of, for example, an AND circuit AND and the output from the AND circuit AND is fed to a coincidence verified output terminal 12. Thus, the verifying device capable of verifying 12 magnetic signal points, in which the prior art verifying device PVD is combined with that IVD, is provided. In this case, the verifying device PVD is provided such that the saturable transformers S as, for example, shown in FIG. 3 are connected in cascade, while the verifying device IVD is provided such that the magnetic sensor S' as, for example, shown in FIG. 5 are connected in parallel as set forth above. Since including the shape of the saturable core, the winding and the circuit, various modifications can be considered for the magnetic sensor, the above embodiment is mere example.

With the combination of the above two verifying device PVD and IVD, the sensors of the verifying section PVD generates a small output upon non-verification, but if a disturbing voltage is applied thereto by the electrostatic or electromagnet induction, there is a possiblity that the magnetic sensors of the prior art verifying section PVD are instantly turned on to malfunction. On the other hand, the magnetic sensors of the verifying section IVD are in on-state upon non-verification and generate a large output under such state. Thus even when the disturbing voltage is applied to the magnetic sensor S' of the verifying section IVD, it never occurs that the output from the magnetic sensor S' becomes small and the magnetic sensor S' is turned off. As a result, the verifying device IVD does not generate the output indicative of the coincidence between the magnetic signals recorded on the set and key cards. Namely, the verifying device of the invention shown in FIG. 6 can be safe against the disturbing voltage. Furthermore, if the magnetic or key card which will generate a strong magnetic field is intentionally used in the verifying section IVD, it may occur that, regardless of the coincidence of the key code, the verifying section IVD tends to generate an output indicative of the coincidence. However, the verifying section PVD is free from this problem so that the whole of the verifying device shown in FIG. 6 does not produce the output indicative of the coincidence between the magnetic signals in such case. That is, the verifying device according to the present invention shown in FIG. 6 is safe against the powerful magnetic card.

As set forth above, since the second embodiment of the verifying device according to the present invention utilizes a convenient combination of those shown in Fig.3 and FIG. 5, when the magnetic signals recorded on the set and key cards are not coincident in both of the verifying sections PVD and IVD, the verifying device does not produce the output representative of the coincidence therebetween. Thus, the second verifying device according to the present invention can obviate the above fear of the first embodiment and defects of the prior art and is very safe.

While in FIG. 6, 6 magnetic signal points are assigned to the verifying sections PVD and IVD, it is needless to say that if the combination of the assignment of the magnetic signal points is arbitrarily changed in the way as 10 magnetic signal points are assigned to the verifying section PVD and 2 magnetic signal points are to the verifying section IVD, the same effect can be achieved.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A verifying device for a key card, said key card having at least first and second magnetic signals recorded at first and second locations thereon, comprising:
- a set card having at least third and fourth magnetic signals recorded at third and fourth locations thereon;
- at least a first saturable core disposed within an influence of said first and third magnetic signals;
- at least a second saturable core disposed within an influence of said second and fourth magnetic signals;
- a first winding on said first saturable core;
- a second winding on said second saturable core;
- an oscillator supplying an oscillating signal in parallel to said first and second windings;
- a first switching element controlled by said oscillating signal through said first winding;
- a second switching element controlled by said oscillating signal through said second winding;
- a parallel coincidence output of said first and second switching elements;
- said first saturable core having a saturation magnetic field greater than a magnetic field available from said first and third magnetic signals acting along and less than a magnetic field available from said first and third magnetic signals acting together; and
- said second saturable core having a saturation magnetic field greater than a magnetic field available from said second and fourth magnetic signals acting alone and less than a magnetic field available from said second and fourth magnetic signals acting together, whereby a coincidence output condition of said parallel coincidence output is achieved only when said first magnetic signal corresponds with said third magnetic signal and said second magnetic signal corresponds with said fourth magnetic signal.

2. A verifying device for a key card according to claim 1, further comprising:
- said key card including at least fifth and sixth magnetic signals recorded at fifth and sixth locations thereon;
- said set card having at least seventh and eighth magnetic signals recorded at seventh and eighth locations thereon;
- at least a third saturable core disposed within the influence of said fifth and seventh magnetic signals;
- at least a fourth saturable core disposed within an influence of said sixth and eighth magnetic signals;
- a first primary winding and a first secondary winding on said third saturable core;
- a second primary winding and a second secondary winding on said fourth saturable core;
- said oscillator supplying an oscillating signal to said first primary winding;
- said first secondary winding being connected to said second primary winding;
- said second secondary winding providing a cascade coincidence output;
- said third saturable magnetic core having a saturation magnetic field which is less than a magnetic field generated by either of said fifth and seventh magnetic signals alone;

said fourth saturable magnetic core having a saturation magnetic field which is less than a magnetic field generated by either said sixth and eighth magnetic signals alone, whereby said third saturable magnetic core is unsaturated in the presence of a fifth magnetic signal in said key card only when said seventh magnetic signal is of opposite magnetic polarity to said fifth magnetic signal and said fourth saturable magnetic core is unsaturated in the presence of a sixth magnetic signal in said key card only when said eighth magnetic signal is of opposite magnetic polarity to said sixth magnetic signal;

an AND gate receiving said parallel coincidence output and said cascade coincidence output and producing a combined coincidence output only when a predetermined relationship exists between magnetic signals on said key card and said set card.

* * * * *